United States Patent [19]

Masevice

[11] 4,074,785

[45] Feb. 21, 1978

[54] BATTERY ENCLOSURE

[75] Inventor: Frank V. Masevice, Mentor, Ohio

[73] Assignee: Towmotor Corporation, Mentor, Ohio

[21] Appl. No.: 673,505

[22] Filed: Apr. 5, 1976

[51] Int. Cl.² .............................................. B60R 18/02
[52] U.S. Cl. ................................... 180/68.5; 292/106; 292/DIG. 4
[58] Field of Search .................. 180/68.5; 220/324, 71, 220/200; 292/106, 207, 283, 256, DIG. 4; 105/50, 51; 280/69 R, 69 C

[56] References Cited

U.S. PATENT DOCUMENTS

| D. 175,804 | 10/1955 | Squier et al. ........................ D12/61 |
| 559,431 | 5/1896 | Andersen ............................. 292/207 |
| 944,792 | 12/1909 | Lambrecht ........................... 292/283 |
| 2,129,250 | 9/1938 | Varker ................................. 292/256 |
| 2,270,563 | 1/1942 | Schnebelen ..................... 180/68.5 X |
| 3,217,825 | 11/1965 | Hauxwell et al. ................... 180/68.5 |
| 3,367,441 | 2/1968 | Schuster et al. .................... 180/68.5 |
| 3,419,184 | 12/1968 | Asenbauer ...................... 220/324 X |
| 3,687,484 | 8/1972 | Cosby ................................. 280/755 |

Primary Examiner—Joseph F. Peters, Jr.
Assistant Examiner—Donn McGiehan
Attorney, Agent, or Firm—Phillips, Moore, Weissenberger, Lempio & Majestic

[57] ABSTRACT

A battery enclosure for an electrically driven vehicle includes side panels, and a plastic top panel reinforced by elongated metal rods mounted relative to the top panel by means of plastic securing members bonded to the top panel. Locking means, including a pivotal member adapted for securing an edge portion of the top panel to a side panel, are included.

9 Claims, 7 Drawing Figures

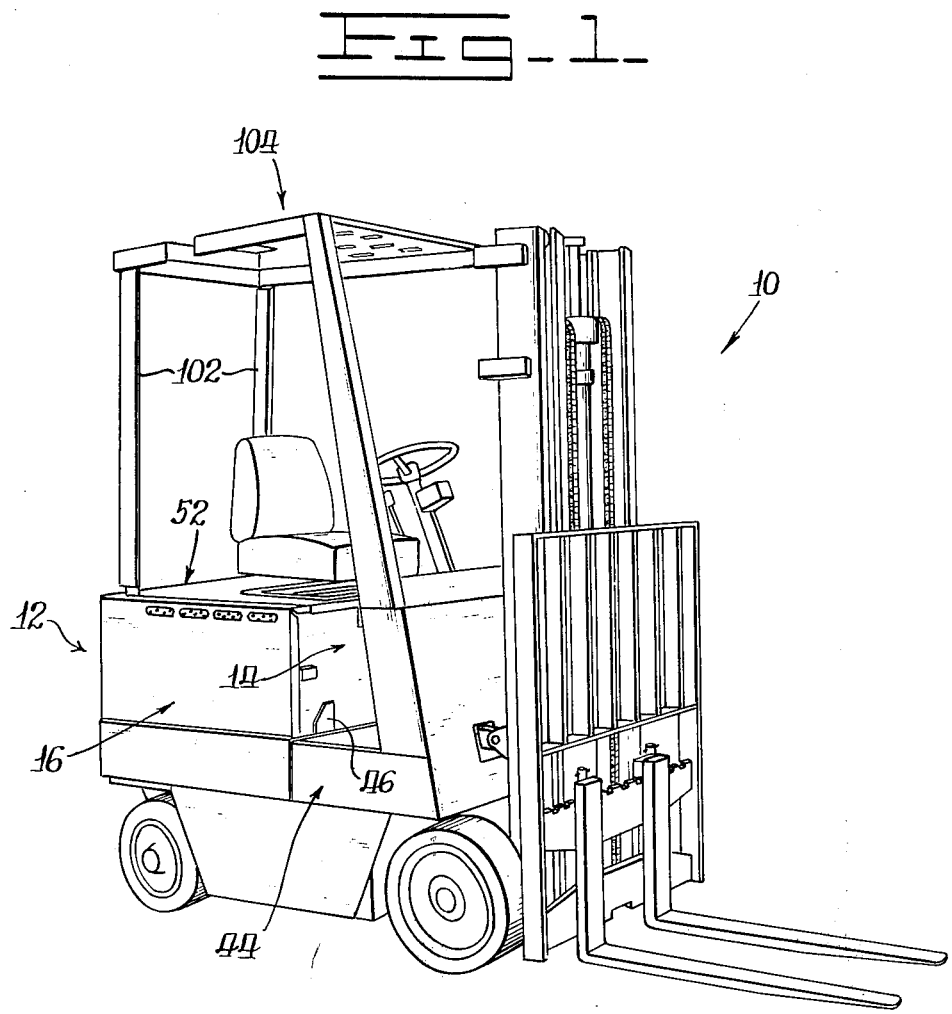

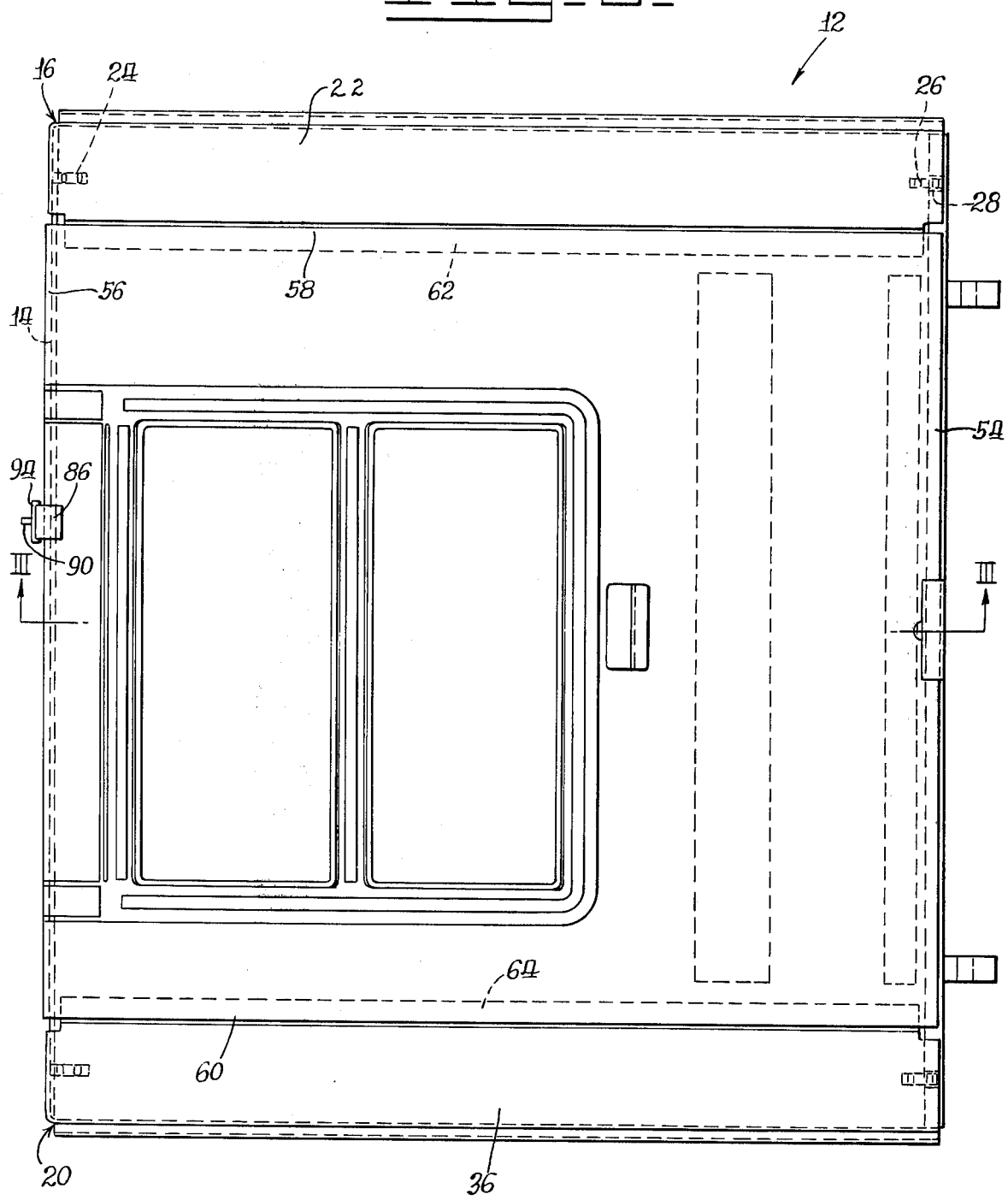

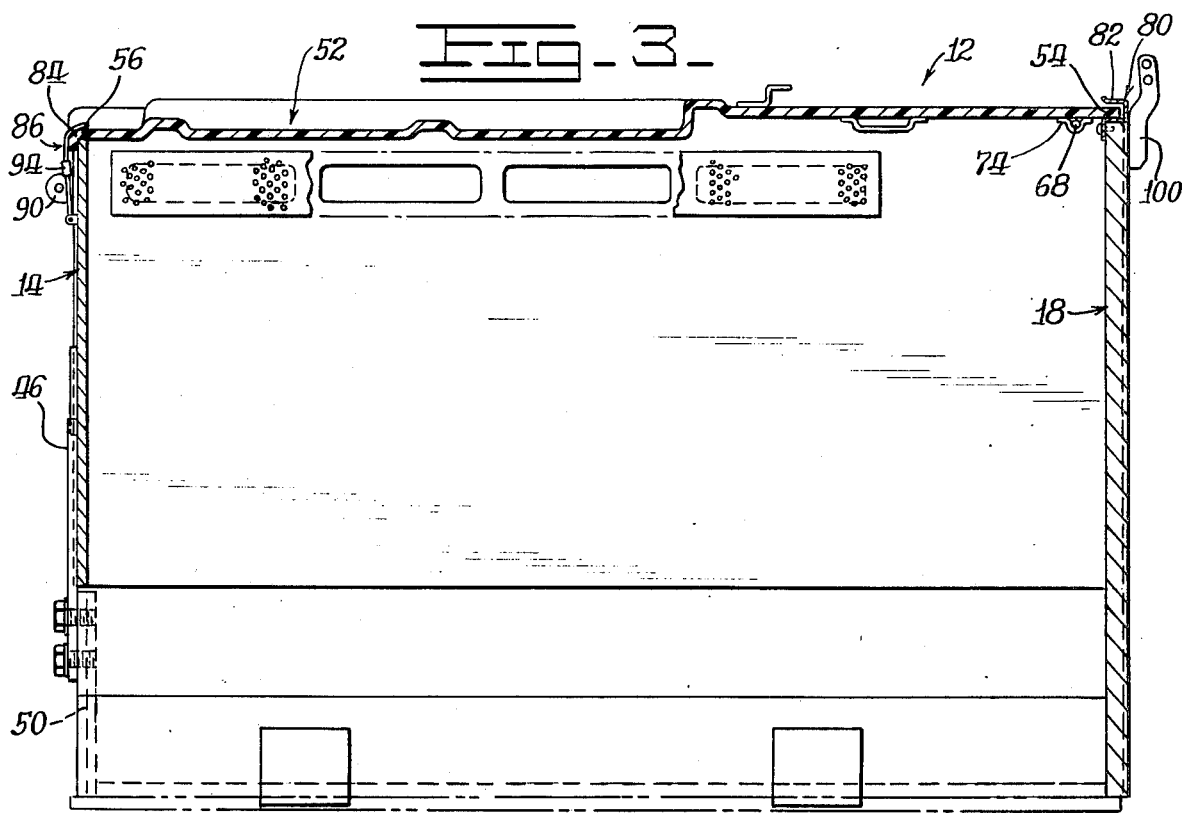
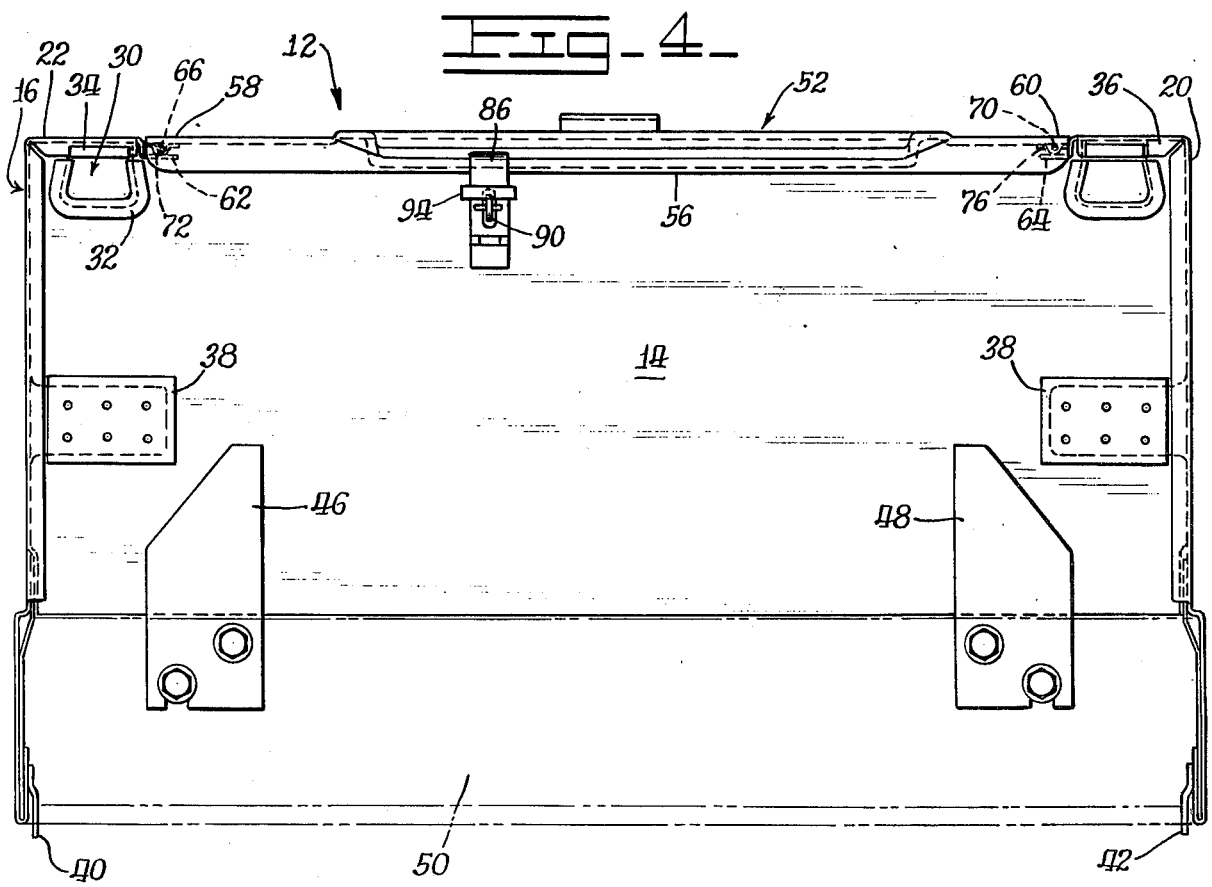

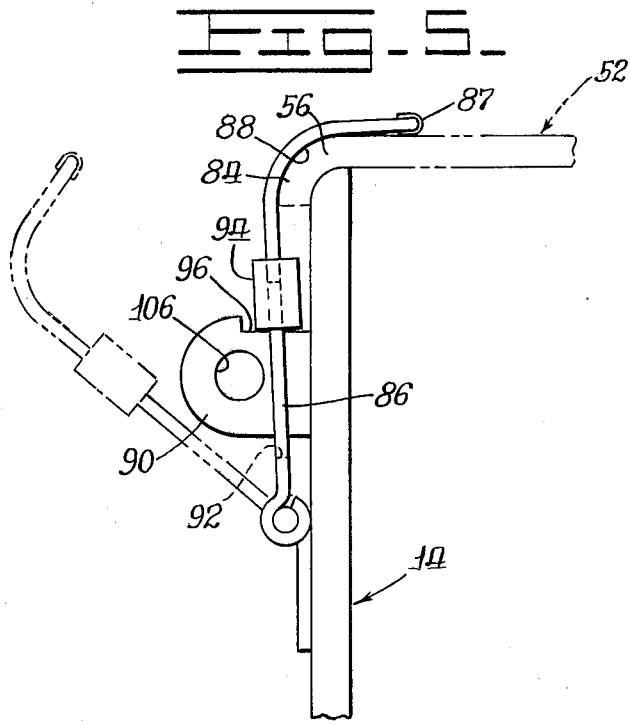
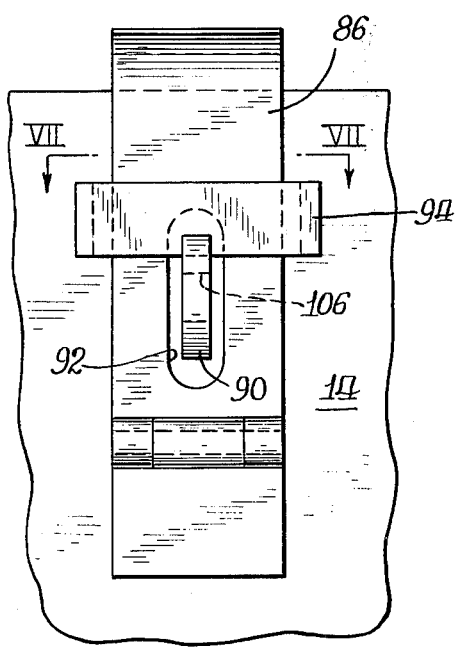
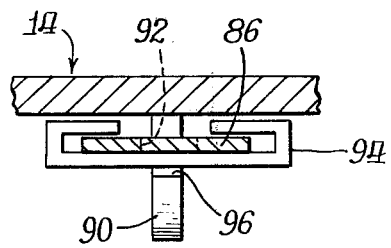

BATTERY ENCLOSURE

BACKGROUND OF THE INVENTION

This invention relates to a vehicle battery enclosure, and more particularly, to an enclosure including top panel locking means, and reinforcement of the top panel for proper load-bearing purposes.

In an electrically driven lift truck or the like, it is well known to provide a battery enclosure, with the top panel of the battery enclosure bearing the load of the driver's weight thereon. For example, reference is made to U.S. Pat. Nos. 3,217,825; 3,367,441; 3,687,484; and U.S. Pat. No. 175,804. While each of these patents is of general interest, it will be understood that, for example, convenient access to the batteries must be provided, but with it also being insured that the elements of the enclosure are properly held in position with the enclosure in place and completely assembled. It should also be understood that a high degree of lightness of certain elements of the enclosure is highly desirable, but with it being insured that the load-bearing capabilities of the enclosure are not sacrificed, and indeed are improved over known systems.

SUMMARY OF THE INVENTION

It is accordingly an object of this invention to provide an enclosure for a battery of a vehicle or the like wherein means are provided for properly holding the elements thereof in position with the parts thereof assembled as such an enclosure.

It is a further object of this invention to provide an enclosure for a battery of a vehicle or the like which, while fulfilling the above object, provides proper load-bearing capability.

It is a further object of this invention to provide an enclosure for a battery of a vehicle or the like which, while fulfilling the above objects, is extremely simple in design and efficient in use.

Broadly stated, the invention comprises an enclosure for a battery of a vehicle or the like comprising a plurality of side panels, and a top panel supportable by the side panels and on which a load may be placed. Means are included for selectively limiting lifting of an edge portion of the so-supported top panel relative to one of the side panels, such means comprising a pivotable member secured to one of the side panels and pivotable to a first position wherein a portion of the pivotable member and a portion of the side panel are disposed on either side of the edge portion of the so-supported top panel in close proximity thereto. Such edge portion of the top panel is thereby limited from lifting relative to the side panel. The pivotable member is pivotable to a second position removed from the so-supported top panel, to allow lifting of the edge portion of the so-supported top panel from the side panel. Further included are means for selectively securing the pivotal member in the first position thereof.

BRIEF DESCRIPTION OF THE DRAWINGS

These and other objects of the invention will become apparent from a study of the following specification and drawings, in which:

FIG. 1 is a perspective view of the lift truck incorporating the present invention;

FIG. 2 is a plan view of the inventive battery enclosure;

FIG. 3 is a sectional view taken along the lines III—III of FIG. 2;

FIG. 4 is a front elevation of the enclosure of FIGS. 2 and 3;

FIG. 5 is an enlarged view of the locking portion of the apparatus as shown in FIG. 3;

FIG. 6 is a front elevation of the apparatus shown in FIG. 5; and

FIG. 7 is a sectional view taken along the lines VII—VII of FIG. 6.

DESCRIPTION OF THE PREFERRED EMBODIMENT

Shown in FIG. 1 is an electrically powered lift truck 10 which includes batteries enclosed by the battery enclosure 12. Such battery enclosure 12 is shown in detail in FIGS. 2–4. The battery enclosure 12 includes metal side panels 14, 16, 18, 20 as shown. The side panel 16 includes a horizontal portion 22 which overlaps end portions of the panels 14, 18 as shown. Locating blocks 24, 26 are secured to the overlapping portion 22, with the rearward locating block 26 positionable in an opening 28 defined by the panel 18, and the locating block 24 positionable in an opening 30 defined by the panel 14. The opening 30 of the panel 14 is relatively large, and has fitted therein a resilient U-shaped member 32. A downwardly extending edge flange of the horizontal portion 22 also has fitted thereto a resilient member 34 of U-shaped cross-section, and the opening defined thereby is used for passage of cables or the like therethrough. The side panel 18 also includes a horizontal portion 36 associated with the opposite ends of the panels 14, 18 in a like manner.

The panel 14 has fixed thereto connector blocks 38 as shown.

The panels 16, 20 define downwardly-extending edge portions 40, 42 which are seatable in appropriate channels defined by the frame 44 of the vehicle 10. Such extending portions 40, 42 serve to position the panels 16, 20 relative to the vehicle 10. The panel 14 has fixed thereto, as, for example, by welding, plates 46, 48 which extend below the lower edge of the panel 14. These plates 46, 48 may be bolted to an appropriate frame element 50 of the vehicle 10 when the panels 16, 20 are so properly located relative to the vehicle 10 as described above.

A rectangular top panel 52 is positionable so that the rearward edge portion 54 thereof is supported by the panel 18, the front edge portion 56 thereof is supported by the panel 14, and the side edge portions 58, 60 thereof are supported by respective inwardly extending portions 62, 64 of the horizontal portions 22, 36 of the panels 16, 20, respectively. The top panel 52 is of plastic material, and elongated metal reinforcing rods 66, 68, 70 are positioned adjacent the edge portions 58, 54, 60 of the top panel, respectively. Such reinforcing rods 66, 68, 70 are secured to the underside of the top panel 52 by means of elongated plastic securing members 72, 74, 76, each extending along a respective reinforcing rod and being bonded to the top panel 52. In fact, the edge portions of each securing member are bonded to the top panel 52 on either side of and along the respective reinforcing rod. The elongated securing members 72, 74, 76 serve to secure the rods 66, 68, 70 relative to the top panel 52, with the rods 66, 68, 70 being substantially fully enclosed by the top panel 52 and the respective securing members.

It will be seen that with the parts positioned as shown in FIG. 4, the securing members 66, 70 are actually in contact with the inwardly-extending portions 62, 64 to provide proper support means for the top panel 52. It is also to be understood that the reinforcing rods 66, 68, 70 aid in insuring that the top panel 52, on which a seat is disposed (FIG. 1), is capable of properly bearing the load placed thereon, with it meanwhile being provided that the top panel 52 is of light, plastic material.

A clip 80 having a substantially U-shaped portion 82 is secured to the top edge of the panel 18, and the edge portion 54 of the top panel 52 is positionable within the U-shaped portion 82 so as to be supported by the panel 18. The edge portion 56 of the top panel 52 defines a curved, extending portion 84 which extends outwardly and downwardly of the panel 14 with the top panel 52 so positioned as shown in FIGS. 2-4. Pivotally fixed to the panel is a pivotal member 86 pivotable to a first or upward position, and pivotal to a second or downward position. The pivotal member 86 defines a curved portion 88 which substantially mates with the curved portion 84, with the pivotal member 86 in its first position, and the top panel 52 positioned as shown in FIGS. 2-4 (see FIGS. 5-7). Also, fixed to the panel is a projecting member 90 which projects through an aperture 92 defined by the pivotal member 86 with the pivotal member 86 in its upward or first position. A slide member 94 is slidably mounted on the pivotal member 86. With the top panel 52 in position as shown in FIGS. 2-4, the pivotal member 86 may be pivoted to its first or upward position wherein the curved portion 88 and a portion of the panel 14 are disposed on either side of the edge portion 56 in close proximity thereto. With the elements thus positioned, the slide member 84 may be slid to seat in a recess 96 defined by the projecting member 90, with the projecting member 90 of course being disposed through the aperture 92 defined by the pivotal member 86 as described above. The pivotal member 86 is thus secured in the first or locking position thereof. It will therefore be seen that the edge portion 56 of the top panel 52 is limited from lifting relative to the panel 14, and upward movement of the edge portion 54 of the top panel 52 is also limited by the clip 80.

The extending end of the pivotal member 86 has secured thereto a resilient protective element 87 to eliminate the possibility of the operator's clothes tearing on the end of such pivotal member as he is seated on the top panel 52.

Upon upward sliding of the slide member 94 along the pivotal member 86 from the recess 96, the pivotal member 86 may be pivoted to the second or downward position thereof, removing the curved portion 88 of the pivotal member 86 from the edge portion 56 of the top panel 52.

It will be seen that the edge portion 56 of the top panel 52 may then be lifted from the panel 14, and the entire panel 52 may be moved forwardly to remove the edge portion 54 from the clip 80, so as to in turn allow access to the batteries.

The panel 18 also has fixed thereto bar members 100 to which the rear legs 102 of the overhead protective structure 104 are secured.

It is to be noted that the projecting member 90 defines an aperture 106 therethrough positioned outward of the pivotal member 86 with the pivotal member 86 in its first or upward position as shown in FIGS. 2-4. A lock or the like may be disposed through such aperture 106 to provide secure locking of the top panel 52 in place with the pivotal member 56 of course in its locking position.

It will therefore be seen that a highly efficient and effective battery enclosure is herein provided, being capable of secure placement of elements when required, and also being capable of properly bearing loads placed thereon.

What is claimed is:

1. An enclosure for a battery of a vehicle or the like comprising:
    a plurality of side panels;
    a top panel supportable by the side panels and on which a load may be placed;
    means for selectively limiting lifting of an edge portion of the so-supported top panel relative to one of the side panels comprising a pivotal member secured to said one of the side panels and pivotable to a first position wherein a portion of the pivotal member and a portion of said side panel are disposed on either side of the edge portion of the so-supported top panel in close proximity thereto, whereby said edge portion of the top panel is limited from lifting relative to said side panel, and pivotable to a second position removed from said so-supported top panel to allow lifting of said edge portion of the so-supported top panel from said side panel; and
    means for selectively securing the pivotal member in said first position thereof; wherein the means for selectively securing the pivotal member in said first position thereof comprise a projecting member secured to said one side panel and projecting through an aperture provided in the pivotal member with the pivotal member in said first position, and means for selectively securing the pivotal member relative to the projecting member of the pivotal member in said first position; and
    wherein the means for selectively securing the pivotal member relative to the projecting member comprise a slide member slidably mounted on the pivotal member and slidable to seat in a recess in the projecting member with the projecting member disposed through the aperture provided in the pivotal member to secure the pivotal member in the first position thereof, and slidable to be removed from said recess to allow pivoting of the pivotal member to the second position thereof.

2. The apparatus of claim 1 wherein the edge portion of the so-supported top panel defines a curved extending portion extending outwardly and downwardly of said side panel, and wherein the pivotal member defines a curved portion substantially mating with said curved portion of the edge portion of the top panel with the pivotal member in the first position thereof.

3. The apparatus of claim 2 and means mounted to another side panel for limiting upward movement of another edge portion of the so-supported top panel relative to said another side panel.

4. The apparatus of claim 3 wherein the projecting member is provided with an aperture therethrough positioned outward of the pivotal member with the pivotal member in its first position.

5. The apparatus of claim 1 wherein the projecting member is provided with an aperture therethrough positioned outward of the pivotal member with the pivotal member in its first position.

6. An enclosure for a battery of a vehicle or the like comprising:

a plurality of side panels;

a top panel supportable by the side panels and on which a load may be placed;

reinforcing means for said top panel comprising an elongated rod, and an elongated separate securing member secured to the underside top panel and securing the rod relative to the underside of top panel;

wherein the top panel is of plastic material, the securing member is of plastic material, and the reinforcing rod is of metal material;

wherein the reinforcing rod is substantially fully enclosed by the securing member and top panel; and wherein the edge portions of the elongated securing member are bonded to the top panel on either side of and along the reinforcing rod.

7. An enclosure for a battery of a vehicle or the like comprising:

a plurality of side panels;

a top panel supportable by the side panels and on which a load may be placed;

first, second and third reinforcing rods positioned adjacent respective first, second and third edge portions and adjacent the underside of the top panel; and first, second and third separate support members secured to the top panel to secure the first, second and third reinforcing rods respectively relative to the top panel;

wherein the top panel is of plastic material, the securing member is of plastic material, and the reinforcing rod is of metal material; wherein the reinforcing rod is substantially fully enclosed by the securing member and top panel; and wherein the edge portions of the elongated securing member are bonded to the top panel on either side of and along the reinforcing rod.

8. The apparatus of claim 7 wherein the top panel is substantially rectangular.

9. Top panel means for use with side panels and defining therewith a battery cover of a vehicle or the like comprising:

a substantially rectangular top panel;

first, second and third reinforcing rods positioned adjacent respective first, second and third edge portions and adjacent the underside of the top panel; and first, second and third separate support members secured to the top panel to secure the first, second and third reinforcing rods respectively relative to the top panel;

wherein the top panel is of plastic material, the securing member is of plastic material, and the reinforcing rod is of metal material;

wherein the reinforcing rod is substantially fully enclosed by the securing member and top panel; and wherein the edge portions of the elongated securing member are bonded to the top panel on either side of and along the reinforcing rod.

* * * * *